(12) United States Patent
Nguyen et al.

(10) Patent No.: US 6,508,872 B2
(45) Date of Patent: Jan. 21, 2003

(54) LIGHTFAST ADDITIVE MOLECULE FOR INKJET INK

(75) Inventors: Khe C Nguyen, Los Altos, CA (US); Sivapackia Ganapathiappan, Los Altos, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 158 days.

(21) Appl. No.: 09/794,811

(22) Filed: Feb. 26, 2001

(65) Prior Publication Data
US 2002/0174802 A1 Nov. 28, 2002
(Under 37 CFR 1.47)

(51) Int. Cl.[7] ............................................. C09D 11/02
(52) U.S. Cl. ................ 106/31.47; 106/31.49; 106/31.77; 106/31.78
(58) Field of Search ........................... 106/31.47, 31.49, 106/31.77, 31.78

(56) References Cited

U.S. PATENT DOCUMENTS

| | | | | |
|---|---|---|---|---|
| 5,073,448 A | * | 12/1991 | Vieira et al. | 347/105 |
| 5,089,505 A | * | 2/1992 | Alker et al. | 514/319 |
| 5,096,489 A | * | 3/1992 | Laver | 106/31.47 |
| 5,096,781 A | * | 3/1992 | Vieira et al. | 346/135.1 |
| 5,098,477 A | * | 3/1992 | Vieira et al. | 106/31.27 |
| 5,124,723 A | * | 6/1992 | Laver | 106/31.47 |
| 5,261,953 A | * | 11/1993 | Vieira et al. | 106/31.43 |
| 5,489,503 A | * | 2/1996 | Toan | 347/100 |
| 5,509,957 A | * | 4/1996 | Toan et al. | 106/31.43 |
| 6,046,330 A | | 4/2000 | Qinghong et al. | |
| 6,102,997 A | * | 8/2000 | Helling et al. | 106/31.43 |

FOREIGN PATENT DOCUMENTS

| | | |
|---|---|---|
| EP | 1020498 A1 | 7/2000 |
| JP | 01282388 | 11/1989 |
| JP | 03269167 | 11/1991 |

* cited by examiner

*Primary Examiner*—Helene Klemanski (57) ABSTRACT

Lightfast additives for inkjet inks are provided. These additives exhibit excellent lightfastness of many dyestuffs (both water-soluble and water-insoluble). The lightfast additives exhibit good water solubility and significant effect on dye and pigment molecules which fade most when exposed to UV, ambient light, etc., and are suitable for improving permanence of inkjet inks, including thermal inkjet ink, piezo inkjet ink, and the like. The lightfast additive comprises a molecule which is composed of three parts or moieties: A—X—B, where (a) moiety A is an aryl sulfonic acid or aryl carboxylic acid, either in acid form or salt form, with or without substituents (e.g., benzene sulfonic acid, naphthalene mono-sulfonic acid, naphthalene di-sulfonic acid, benzoic acid, benzene sulfonic acid sodium salt, and hydroxybenzenesulfonic acid sodium salt), that contributes to the water solubility and compatibility (molecular overlapping) with the dye molecule in the solid state; (b) moiety B is a triazine, benzotriazole, tetrazole, or benzimidazole, with or without substituents, that contributes to improvement of lightfastness of the dye; and (c) moiety X is a connector (—NR— or —O—) between A and B.

18 Claims, 2 Drawing Sheets

LIGHTFAST ADDITIVE MOLECULE FOR INKJET INK

TECHNICAL FIELD

The present invention is directed generally to inkjet inks, and, more particularly, to inkjet inks having improved lightfastness.

BACKGROUND ART

Inkjet inks have been known for some time, and have been commercialized by a number of manufacturers, including Hewlett-Packard. Many issues have been addressed over the years, such as kogation, water fastness, and smear fastness. Improvements in ink compositions have led to improved resistance to kogation and improved water fastness and smear fastness, among other properties.

With many of the basic problems overcome, or at least alleviated, attention has turned to providing ink formulations with improved lightfastness. Lightfastness is a measure of the stability of the ink when exposed to ambient light. Many of the colorants (dyes and pigments) tend to fade upon prolonged exposure to light, particularly ultraviolet (UV) light.

Accordingly, it is desired to provide an ink formulation having improved stability to light, that is, able to withstand fading upon exposure to ambient light, so that the print, whether black or color, remains virtually unchanged over time.

DISCLOSURE OF INVENTION

In accordance with the present invention, lightfast additives are provided. These additives exhibit excellent lightfastness with many dyestuffs (both water-soluble and water-insoluble). Thus, the lightfast additives work with both dyes (water-soluble and water-insoluble) and pigments (which are water-insoluble). While pigments are known for their lightfastness, compared to dyes, nevertheless, use of the additives of the present invention can further improve the lightfastness of pigments.

The lightfast additives of the present invention exhibit good water solubility and significant effect on dye and pigment molecules which fade most when exposed to UV, ambient light, etc., and are suitable for improving permanence of inkjet inks, including thermal inkjet ink, piezo inkjet ink, and the like.

According to the present invention, the molecule which can improve the lightfastness of the dyes is composed of three parts or moieties:

(I)

where:
  moiety A contributes to the water solubility and compatibility (molecular overlapping) with dye molecule in solid state;
  moiety B contributes to improvement of lightfastness of the dye; and
  moiety X is a connector between A and B.

By "compatibility" is meant that the dye or pigment molecules and the lightfast additive molecules have a similar or partly similar structure so that they can "overlap" effectively. By "molecular overlap" is meant that molecules with similar structures mix very well in solution. They maintain homogeneity. Even in the solid state, this homogeneity is maintained when the solvent is removed. That is to say, there is no phase separation, either in the liquid state or in the solid state.

In the above molecule (I), moiety A is an aryl sulfonic acid metal salt with or without substituents, for example, benzene sulfonic acid, benzene sulfonic acid sodium salt, hydroxybenzenesulfonic acid sodium salt, naphthalene mono or di sulfonic acid, acid form and salt form, moiety X is —NR—, —O—, and moiety B is a triazine, benzotriazole, tetrazole, or benzimidazole, with or without substituents.

The A—X—B molecules where B is a triazine can be prepared by a one-step reaction of reactive triazines (e.g., cyanuric chloride, melamine) with reactive aryl sulfonic acid (amino, diamino). For A—X—B molecules where B is a benzotriazole, a tetrazole, or a benzimidazole, alternate routes are used.

In any event, the lightfastness of inkjet inks containing dyes or pigments is improved, compared to inks not containing the additive of the present invention.

BEST MODES FOR CARRYING OUT THE INVENTION

Reference is now made in detail to specific embodiments of the present invention, which illustrate the best modes presently contemplated by the inventors for practicing the invention. Alternative embodiments are also briefly described as applicable.

All concentrations herein are expressed in weight percentages, unless otherwise indicated. The purity of all components is that employed in normal commercial practice for inkjet inks.

According to the present invention, the molecule which can improve the lightfastness of the dyes is composed of three parts or moieties:

(I)

where:
  moiety A contributes to the water solubility and compatibility (molecular overlapping) with dye molecule in solid state;
  moiety B contributes to improvement of lightfastness of the dye; and
  moiety X is a connector between A and B.

In the above molecule (I), moiety A is an aryl sulfonic or carboxylic acid or acid salt with or without substituents. Examples of A moieties include, but are not limited to, benzene sulfonic acid, naphthalene mono-sulfonic acid, naphthalene di-sulfonic acid, benzoic acid, benzene sulfonic acid sodium salt, and hydroxybenzene-sulfonic acid sodium salt. As noted, moiety A may be in its acid form or in its salt form. With regard to the acid form, sulfonic acid includes the —SO$_3$H group and the carboxylic acid includes the —COOH group; the salt forms include potassium, lithium, and sodium as the counterion. Substituents are selected from the group consisting of halogens (X), alkyls, aryls, substituted alkyls, substituted aryls, esters (—O—), ethers (—OR), alcohols (—OH), and amides (—NR$_2$), where R is H or alkyl or aryl or substituted alkyl or aryl.

Moiety X is a connector, such as —NR— or —O—. R may be H or an alkyl or substituted alkyl, aryl, or substituted aryl.

Moiety B is a triazine, benzotriazole, tetrazole, or benzimidazole, with or without substituents. Substituents on the B moiety are selected from the same group as the substituents on the A moiety, but are independent of the A moiety substituents.

In a single molecule, there may be two or more X moieties, connecting additional A moieties to B moieties or connecting additional B moieties to A moieties.

The A—X—B molecules can be prepared, for example, by one-step reaction of reactive triazines (e.g., cyanuric chloride or melamine) with reactive aryl sulfonic acid salt (e.g., amino or diamino):

With regard to the benzotriazoles, tetrazoles, benzimidazoles, one skilled in this art can design the appropriate reactions without undue experimentation to prepare the lightfast additives of the present invention.

The A moieties include —SO$_3$M and —COOM groups, where M is H, Li, Na, or K. Examples of the A moieties include, but are not limited to:

benzyl      naphthyl where R=—SO$_3$M or —CO$_2$M; and
R'=H, —OH, —NH$_2$, X, alkyl, or aryl.

Examples of B moieties include, but are not limited to:

triazines      benzimidazoles (phenyl subs.)

benzimidazoles (benzimidazolyl)      benzotriazoles (phenyl subs.)

benzotriazoles (benzotriazolyl)      tetrazoles (C-substituted)      tetrazoles (N-substituted)

The phrase in parenthesis for the benzimidazoles and benzotriazoles indicates whether the substituent is on the phenyl ring ("phenyl subs.") or on the nitrogen-containing ring ("benzimidazolyl" or "benzotriazolyl"). The phrase in the parenthesis for the tetrazoles indicates whether the substituent is bound to the carbon atom ("C-substituted") or replaces the hydrogen on the 1-nitrogen ("N-substituted").

Examples of A—X—B compounds of the present invention include, but are not limited to:

(1) Reaction product of 4-amino-5-hydroxy-2,7-naphthalene disulfonic acid (disodium salt) and cyanuric chloride (mono- and tri-substituted compounds):

It will be seen that the tri-substituted compound involves three connectors X (here, —NH—), connecting three A moieties to a single B moiety.

(2) Reaction product of 3-amino-2-hydroxy-benzene sulfonic acid (acid form) and cyanuric chloride (mono- and tri-substituted compounds):

The Na salt and the acid forms have been shown separately above. However, the salt and acid forms may be employed interchangeably in the practice of the present invention. Further, where there are multiple sulfonic groups on a single molecule, a mixture of both salt and acid forms may be employed. For example, in the naphthalene compound shown (Reaction 1), both sulfonic groups may be the salt (e.g., sodium, as shown), or both may be the acid form, or one may be the salt and one may be the acid.

(3) Reaction product of a benzene or naphthalene sulfonic acid and chlorozotriazole:

(4) Reaction product of 4,4'-diamino-2,2'-stilbene disulfonic acid:

as well as the corresponding isomer without the —CH═CH— group:

As can be seen from the foregoing, the A—X—B compound of the present invention can use more than one connector X to connect, say two or three B moieties to a single A moiety or two or three A moieties to a single B moiety. The foregoing two compounds each show two B moieties connected to a single A moiety.

(5) The following A—X—B compound comprises three B moieties connected to a single A moiety, and involves the reaction of 3 moles of cyanuric acid with one mole of a substituted (R) benzene sulfonic acid:

The value of n is from 1 to 3 (at n=3, R is absent). Again, the acid form or a mixed salt and acid form may be used. Further, a compound similar to the naphthalene compound shown in Reaction 1 above could comprise the single A moiety to which three B moieties are connected:

(6) The combination of A moieties, B moieties, and X connectors can be "mixed and matched" to provide complex molecules for fine tuning the properties of the lightfast additive of the present invention. Examples of such complex molecules include the following:

The lightfast additives of the present invention (1) are very effective at reducing fade of the printed ink upon exposure to UV and ambient light, (2) are water-soluble, and and the corresponding compound where the fluorene group is replaced with a single phenyl group which may be substituted:

Yet another example of a compound having multiple A, B, and X moieties is:

hence addition of surfactant is not needed, (3) are colorless and hence can be used either in the ink or pre-printed on the substrate, (4) require only a simple chemical reaction to prepare and is low cost, and (5) are chemically neutral and will not affect the pH of the ink, which means that the ink can be printed at a desired low pH.

The lightfast additives are added to conventional inkjet inks, which typically comprise a vehicle and one or more colorants (dyes or pigments).

The inks of the present invention comprise (1) about 5 to 50 wt %, preferably about 10 to 40 wt %, water-miscible organic co-solvent, (2) about 0.05 to 10 wt %, preferably about 0.5 to 10 wt %, colorant, (3) about 0.1 to 40 wt %, preferably about 0.1 to 10 wt %, and most preferably about 0.5 to 6 wt %, lightfast additive of the present invention, and (4) water. Other components and additives to the ink may also be present, as discussed below.

The co-solvents comprise one or more organic, water-miscible solvents commonly employed in ink-jet printing. Classes of co-solvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of co-solvents that are preferably employed in the practice of this invention include, but are not limited to, N-methyl pyrrolidone, 1,5-pentanediol, 2-pyrrolidone, diethylene glycol, 1,3-(2-methyl)-propanediol, 1,3,5-(2-methyl)-pentanetriol, tetramethylene sulfone, 3-methoxy-3-methylbutanol, glycerol, and 1,2-alkyldiols.

The following pigments are useful in the practice of the invention; however, this listing is not intended to limit the invention. The following pigments are available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following pigments are available from Cabot: Monarch® 1400, Monarch® 1300, Monarch® 1100, Monarch® 1000, Monarch® 900, Monarch® 880, Monarch® 800, Monarch® 700, Cabojet200, Cabojet300, IJX55, and IJX76. The following pigments are available from Ciba-Geigy: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U. Printex V, Printex 140U, and Printex 140V. The following pigment is available from DuPont: Tipure® R-101. The following pigments are available from Heubach: Dalamar® Yellow YT-858-D and Heucophthal® Blue G XBT-583D. The following pigments are available from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10 GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, L75-2577 Yellow, YGD 9374 Yellow, YHD 9123 Yellow, YCD 9296 Yellow, YFD 1100 Yellow, QHD6040 Magenta, QFD1180 Magenta, RFD3217 Magenta, QFD1146 Magenta, RFD9364 Magenta, QFD 9334 Magenta, BCD6105 Cyan, BCD9448 Cyan, BCD6060 Cyan, BFD5002 Cyan, BFD1121 Cyan, and LHD9303 Black.

Dyes, whether water-soluble or water-insoluble, may be employed in the practice of the present invention. Examples of water-soluble dyes include the sulfonate and carboxylate dyes, specifically, those that are commonly employed in ink-jet printing. Specific examples include: Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine O, Azure B, Azure B Eosinate, Basic Blue 47, Basic Blue 66, Thioflacin T (Basic Yellow 1), and Auramine O (Basic Yellow 2), all available from Aldrich Chemical Company. Further specific examples of water-soluble dyes (anionic) include Direct Yellow 132, Direct Blue 199, and Magenta 377 (Ilford AG, Switzerland), alone or together with Acid Red 52. Examples of water-insoluble dyes include azo, xanthene, methine, polymethine, and anthroquinone dyes. Specific examples of water-insoluble dyes include Ciba-Geigy Orasol Blue GN, Ciba-Geigy Orasol Pink, and Ciba-Geigy Orasol Yellow.

In the event that one or more surfactants are employed in the ink composition, the concentration of such surfactant(s) is in the range of about 0.001 to 10 wt %, preferably about 0.01 to 5 wt %, of the ink.

The balance of the ink is water, together with other additives commonly added to ink-jet inks, which are employed to optimize the properties of the ink for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

EXAMPLES

Example 1

Lightfast Improvement with Acid Red 52 Dye

Various lightfast additives were evaluated to determine the effect of the additives on fade. In this connection, lightfastness was evaluated in an hpuv fadeometer, available from Atlas Corp. Specifically, the lightfastness was measured under conditions in which the fadeometer had an intensity of 58 to 70 Klux, for 72 hours. The OD was measured prior to and subsequent to the light exposure. The OD loss was determined by the ANSI standard IT 9.9 method (1996).

For black, cyan, magenta, and yellow, the lower the value of OD loss, the better the lightfastness. For blue, green, and red, it is important to have uniform color as the sample fades. For these colors, the difference between the two primary colors is measured. Values near zero indicate uniform color, while values greater than or less than zero indicate color imbalance, resulting in non-uniform image quality.

Figure 1:
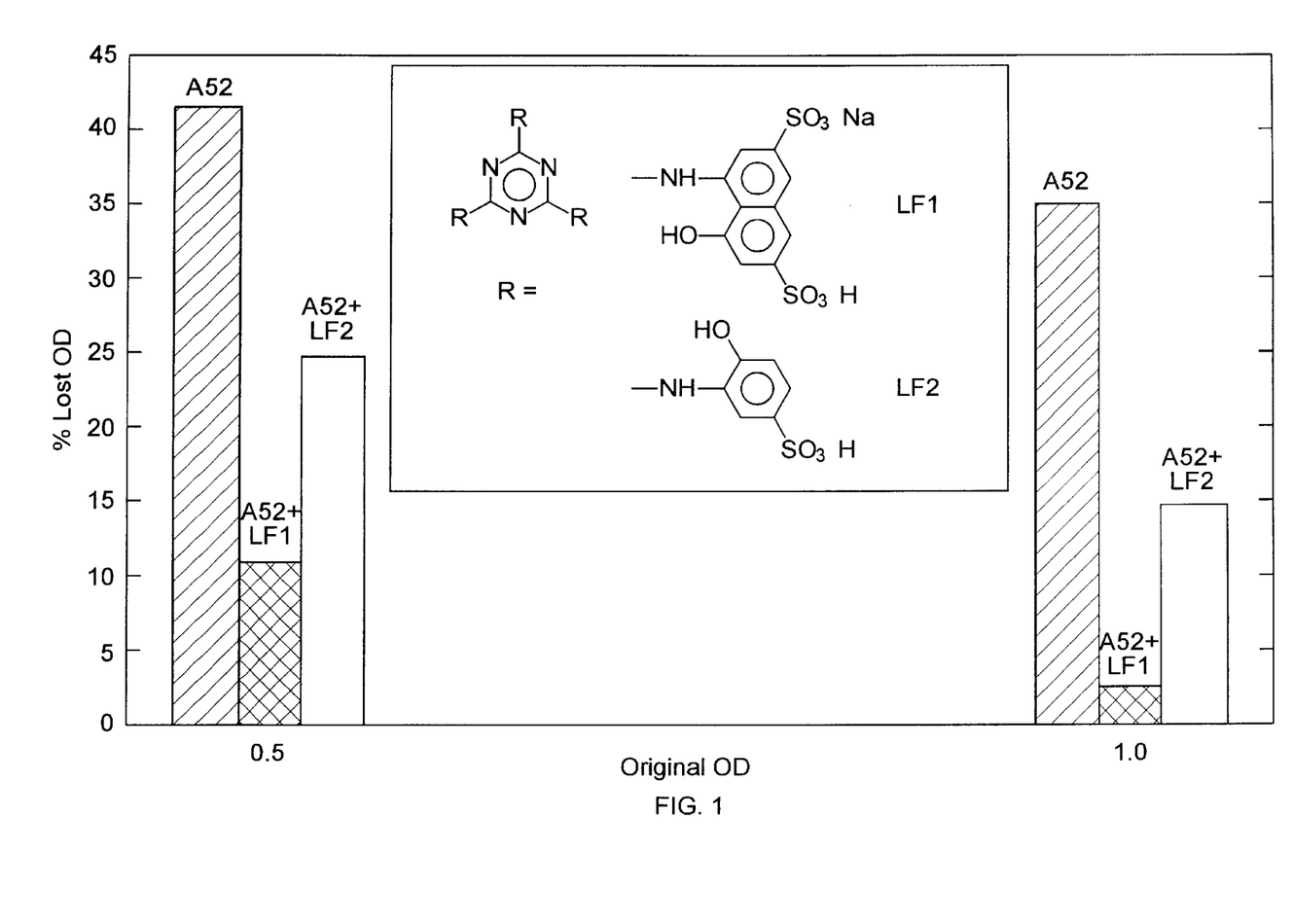
FIG. 1, on coordinates of percent lost optical density (OD) and original OD, is a series of bar plots showing the light fade of a magenta dye (Acid Red 52) without and with two different lightfast additives of the present invention on glossy media.

FIG. 1 illustrates the reduction in optical density loss as a result of using either of two lightfast additives of the present invention, both of which are tri-substituted triazines. The lightfast additive designated LF1 is the reaction product of three moles of 4-amino-5-hydroxy-2,7-naphthalene disulfonic acid (monosodium salt) and one mole of cyanuric chloride, while the lightfast additive designated LF2 is the reaction product of three moles of 3-amino-2-hydroxy-benzene sulfonic acid (acid form) and one mole of cyanuric chloride. The dye was Acid Red 52, and the original OD was either 0.5 or 1.0.

The medium printed on was a low cost glossy print medium, available either as (1) Hewlett-Packard Professional Brochure and Flyer Paper—Two-Sided Gloss (product designation C-6817A) or (2) Hewlett-Packard Photoquality Inkjet Paper—Two-Sided Semigloss (product designation C-6983A).

As can be seen, both LF1 and LF2 reduced the amount of optical density lost as a result of exposure to light in the fadeometer.

Figure 2:
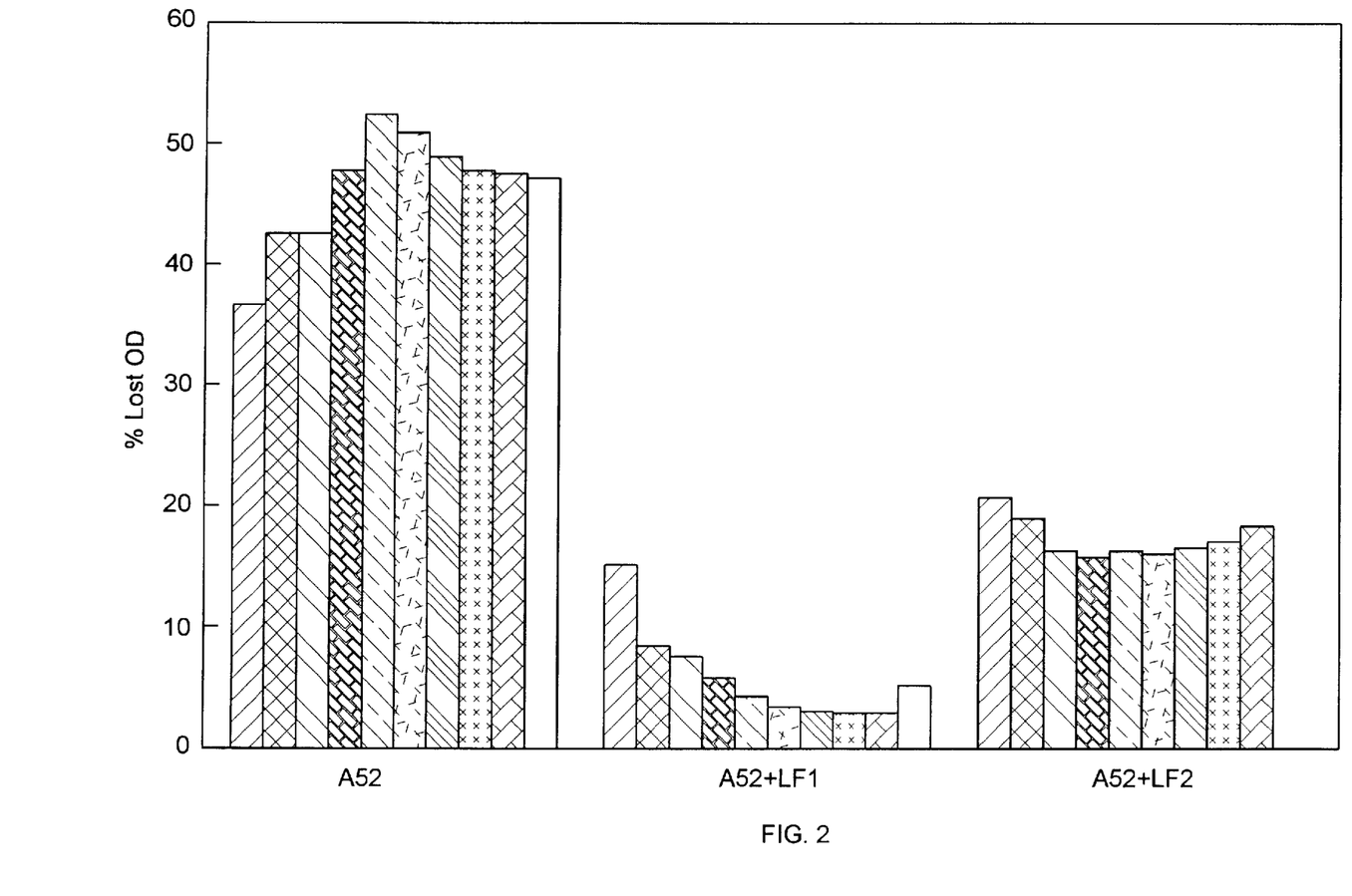
FIG. 2, on coordinates of percent lost OD and composition (the same three compositions as in FIG. 1), is a series of bar plots showing the effect of different print media on light fade.

FIG. 2 illustrates the reduction in optical density loss as a result of using either LF1 or LF2 on different print media. It will be seen that the particular ink composition is relatively independent of the medium on which it is printed, but that the inks containing the lightfast additives result in considerably less loss in optical density than an ink not containing any such additive.

Based on the foregoing results depicted in FIGS. 1 and 2, it is evident that LF1 is seen to be superior to LF2. Both, however, are significantly better than the dye alone.

Examples 2–7

Lightfast Improvement with a Mixture of Magenta 377 and Acid Red 52 Dyes.

The light stability of an ink containing two magenta dyes, M-377 and Acid Red-52, with and without the presence of the lightfast additives of the present invention is shown below. This dye combination significantly improves the humid fade performance on print media such as Hewlett-Packard Heavy Weight Coated Paper (product designation 6022B-36 inch roll) and improves the fade on other print media such as glossy print media. However, AR-52 is a fugitive dye, and will affect the fade performance on yet other print media such as certain other glossy print media.

A Hewlett-Packard DeskJet 895C printer, fitted with C1823D cartridges filled with magenta ink having the base formulation listed below, was used to print alphanumeric characters on Hewlett-Packard Heavy Weight Coated Paper, glossy print media, and several bond papers. A number of different ink formulations were prepared without and with a lightfastness additive of the present invention.

The basic ink formulation (without colorant) is listed in Table I below.

TABLE I

Basic Ink Formulation.

| Component/Color | Concentration |
| --- | --- |
| Proxel GXL (algicide) | 0.2 wt % |
| FLUORAD FS-62 (surfactant) | 0.2 wt % |
| TERGITOL 15-S-7 (surfactant) | 0.35 wt % |
| 1,2-propanediol (co-solvent) | 8 wt % |
| EHPD (co-solvent) | 8 wt % |
| EDTA, acid form (buffer) | 0.08 wt % |
| MOPS (buffer) | 0.12 wt % |
| DDI Water | Balance |
| Total | 100 wt % |

Notes: EDTA is ethylene diamine tetraacetate.
DDI water is distilled deionized water.
pH is adjusted with KOH for the vehicle to 7.2 to 7.3.
pH is adjusted with KOH or $HNO_3$ for final ink to 7.5 to 7.6.
Proxel GXL is a biocide.
MOPS is 4-morpholinepropanesulfonic acid.
EHPD is ethylhydroxypropanediol.

To the basic ink formulation given in Table I was added the colorant, specifically, a mixture of Magenta 377 and Acid Red 52 dyes. For comparison, AR 52 was substituted with Acid Red 289 in one case. Compositions were also prepared either with or without a lightfast additive of the present invention. A number of different such lightfast additives were used. The lightfast additives are denoted I, II, III, and IV and are as follows:

Additive I was

Additive II was

Additive III was

Additive IV was

The compositions containing the colorant and lightfast additive of the present invention are shown in Table II below.

TABLE II

Magenta Ink Compositions with and without Additive.

| Example | Colorant | Additive, wt % |
| --- | --- | --- |
| 2 | Na-M377: A = 0.074<br>Na-AR52: A = 0.044 | — |
| 3 | Na-M377: A = 0.074<br>Na-AR52: A = 0.044 | I: 2 wt % |
| 4 | Na-M377: A = 0.074<br>Na-AR52: A = 0.044 | II: 2 wt % |

TABLE II-continued

Magenta Ink Compositions with and without Additive.

| Example | Colorant | Additive, wt % |
|---------|----------|----------------|
| 5 | Na-M377: A = 0.074 | III: 2 wt % |
|   | Na-AR52: A = 0.044 | |
| 6 | Na-M377: A = 0.074 | IV: 2 wt % |
|   | Na-AR52: A = 0.044 | |
| 7 | Na-M377: A = 0.074 | — |
|   | Na-AR289: A = 0.026 | |
| control | Na-M377: A = 0.079 | — |
|   | Na-AR52: A = 0.038 | |

Note: Absorbance (A) spectra were measured on a Hewlett-Packard 8453 spectrophotometer at 1:10,000 dilution.

The inks were printed on two different glossy print media, both of the same experimental composition, but one of which, designated "salt", included a light fast salt on the media and is the subject of application Ser. No. 09/693676, filed on Oct. 19, 2000. Prints were subjected to the fadetest diagnostic method described in Example 1. Specifically, the printed media were exposed for 72 hours at 73 Klux and 23° C. and 48% elative humidity.

The percent OD loss from an initial 0.3 OD, 0.5 OD, and 1.0 OD are reported in the following Table IV.

TABLE IV

Percent OD Loss of Dyes on Hewlett-Packard High Gloss Photopaper CP After 72 hours @ 73 Klux, 23° C. and 48% R.H. (2.2 years)

| Ink | Media | M (orig. OD = 0.3) | M (orig. OD = 0.5) | M (orig. OD = 1.0) |
|-----|-------|--------------------|--------------------|--------------------|
| | Failure Criteria-Maximum OD Loss Allowed | 20% | 20% | 20% |
| M377* | glossy paper + Salt | 4% | 2% | 4% |
| Ex. 2 | glossy paper + Salt | 9% | 9% | 7% |
| Ex. 3 | glossy paper + Salt | 10% | 9% | 10% |
| Ex. 4 | glossy paper + Salt | 9% | 9% | 8% |
| Ex. 5 | glossy paper + Salt | 6% | 7% | 4% |
| Ex. 6 | glossy paper + Salt | 5% | 5% | 3% |
| Ex. 7 | glossy paper + Salt | 13% | 11% | 11% |
| M377* | glossy paper | 1% | 4% | 3% |
| Ex. 2 | glossy paper | 9% | 9% | 7% |
| Ex. 3 | glossy paper | 6% | 8% | 8% |
| Ex. 4 | glossy paper | 8% | 7% | 8% |
| Ex. 5 | glossy paper | 5% | 5% | 5% |
| Ex. 6 | glossy paper | 5% | 5% | 4% |
| Ex. 7 | glossy paper | 14% | 13% | 11% |

M377 indicates control with only M377 dye (AR52 not present).

The following results were observed:

Additive IV improves the fade of the control magenta on both high glossy print media by 50%.

Additive III improves the fade of the control magenta on both high glossy print media by 40%.

INDUSTRIAL APPLICABILITY

The lightfast additives of the present invention are expected to find use in inkjet inks.

Thus, lightfast additives have been disclosed for rendering inkjet inks more lightfast than without such additives. It will be readily apparent to those skilled in this art various changes and modifications of an obvious nature may be made, and all such changes and modifications are considered to fall within the scope of the present invention as defined by the appended claims.

What is claimed is:

1. An inkjet ink containing a vehicle and at least one colorant, said inkjet ink further containing at least one lightfast additive rendering inkjet inks more lightfast than without said additive, said lightfast additive comprising three moieties:

$$A—X—B \qquad (I)$$

where:

moiety A is an aryl sulfonic acid or aryl carboxylic acid, either in acid form or salt form, with or without substituents;

moiety X is —NR— or —O—; wherein R is selected from the group consisting of H, an alkyl, a substituted alkyl, aryl and a substituted aryl; and moiety B is a triazine, benzotriazole, tetrazole, or benzimidazole, with or without substituents.

2. The inkjet ink of claim 1 wherein moiety A is selected from the group consisting of benzene sulfonic acid, naphthalene mono-sulfonic acid, naphthalene di-sulfonic acid, benzoic acid, benzene sulfonic acid salt, and hydroxybenzenesulfonic acid salt.

3. The inkjet ink of claim 1 wherein said salt comprises a counterion selected from the group consisting of potassium, lithium, and sodium.

4. The inkjet ink of claim 1 wherein said substituents for said A and B moieties are independently selected from the group consisting of halogens (X), alkyls, aryls, substituted alkyls, substituted aryls, esters (—O—), ethers (—OR), alcohols (—OH), and amides (—NR$_2$), where R is H or alkyl or aryl or substituted alkyl or aryl.

5. The inkjet ink of claim 1 wherein said ink contains from about 0.1 to 40 wt % of said lightfast additive.

6. The inkjet ink of claim 5 wherein said ink contains from about 0.1 to 10 wt % of said lightfast additive.

7. The inkjet ink of claim 6 wherein said ink contains from about 0.5 to 6 wt % of said lightfast additive.

8. The inkjet ink of claim 1 wherein said lightfast additive is selected from the group consisting of and 9. The inkjet ink of claim 1 wherein said colorant is a dye or pigment.

10. The inkjet ink of claim 1 wherein said vehicle comprises at least one water-miscible organic co-solvent and at least one additive selected from the group consisting of biocides, pH modifiers and buffers, sequestering agents, and viscosity modifiers.

11. A method of improving lightfastness in inkjet inks, wherein said inkjet inks comprise a vehicle and at least one colorant, said method comprising adding at least one lightfast additive to said ink, said lightfast additive comprising three moieties:

$$A—X—B \qquad (I)$$

where:
moiety A is an aryl sulfonic acid or aryl carboxylic acid, either in acid form or salt form, with or without substituents;
moiety X is —NR— or —O—; wherein R is selected from the group consisting of H, an alkyl, a substituted alkyl, aryl and a substituted aryl; and
moiety B is a triazine, benzotriazole, tetrazole, or benzimidazole, with or without substituents.

12. The method of claim 11 wherein moiety A is selected from the group consisting of benzene sulfonic acid, naphthalene mono-sulfonic acid, naphthalene di-sulfonic acid, benzoic acid, benzene sulfonic acid salt, and hydroxybenzenesulfonic acid salt.

13. The method of claim 12 wherein said salt comprises a counterion selected from the group consisting of potassium, lithium, and sodium.

14. The method of claim 11 wherein said substituents for said A and B moieties are independently selected from the group consisting of halogens (X), alkyls, aryls, substituted alkyls, substituted aryls, esters (—O—), ethers (—OR), alcohols (—OH), and amides (—NR₂), where R is H or alkyl or aryl or substituted alkyl or aryl.

15. The method of claim 11 wherein said ink contains from about 0.1 to 40 wt % of said lightfast additive.

16. The method of claim 15 wherein said ink contains from about 0.1 to 10 wt % of said lightfast additive.

17. The method of claim 16 wherein said ink contains from about 0.5 to 6 wt % of said lightfast additive.

18. The method of claim 11 wherein said lightfast additive is selected from the group consisting of and

* * * * *